United States Patent [19]

Findeis et al.

[11] Patent Number: 5,132,725
[45] Date of Patent: Jul. 21, 1992

[54] PHOTOGRAPHIC COPYING MACHINE FOR USE WITH MOBILE CASSETTES

[75] Inventors: Günter Findeis, Sauerlach; Reinhard Nicko, Munich; Erich Schlick, Lohhof; Reiner Scholz, Munich, all of Fed. Rep. of Germany

[73] Assignee: Agfa-Gevaert Aktiengesellschaft, Leverkusen, Fed. Rep. of Germany

[21] Appl. No.: 759,879

[22] Filed: Sep. 13, 1991

[30] Foreign Application Priority Data

Oct. 1, 1990 [DE] Fed. Rep. of Germany ....... 4031024

[51] Int. Cl.⁵ .............................................. G03B 27/58
[52] U.S. Cl. ..................................... 355/72; 242/71.1
[58] Field of Search .................. 355/72; 242/71.1, 191, 242/55.2, 68

[56] References Cited

U.S. PATENT DOCUMENTS

| | | | |
|---|---|---|---|
| 4,218,032 | 8/1980 | Nagel | 242/71.1 |
| 4,298,276 | 11/1981 | Tsuda et al. | 355/72 |
| 4,469,291 | 9/1984 | Treiber | 242/191 |
| 4,853,742 | 8/1989 | Payrhammer | 355/27 |

Primary Examiner—Richard A. Wintercorn
Attorney, Agent, or Firm—Peter K. Kontler

[57] ABSTRACT

A photographic copying machine has a copying unit which must receive a web of unexposed photosensitive web material well above the floor level. The web material is confined in cassettes which must be lifted before they reach a level in which the web material which is confined therein can be drawn into the copying unit. In order to facilitate manual manipulation of a relatively heavy and bulky cassette, the latter is provided with handless and with one part of a separable coupling which constitutes a hinge and enables the person in charge to pivot the cassette to an upright position subsequent to manual lifting approximately to the chest level. If necessary, the pivoted cassette is thereupon pushed into a chamber of the copying unit. A cassette for reception and storage of freshly exposed photosensitive web material can be manipulated in the same way.

21 Claims, 3 Drawing Sheets

PHOTOGRAPHIC COPYING MACHINE FOR USE WITH MOBILE CASSETTES

BACKGROUND OF THE INVENTION

The invention relates to improvements in copying machines in general, and more particularly to improvements in copying machines, such as photographic roll copiers, wherein webs of photosensitive material (such as unexposed and exposed photographic paper) are confined in mobile containers of the type known as cassettes. Copying machines of such character are described and shown, for example, in commonly owned U.S. Pats. Nos. 4,469,291 and 4,853,742 to which reference may be had, if necessary.

German Pat. No. 25 18 670 discloses a photographic roll copying machine wherein a cassette which contains a supply of unexposed photographic web material (such as photographic paper) must be raised by a motor-driven elevator from a first level to a second level so that its outlet for the web of photosensitive material is moved into register with the inlet of a copying unit wherein images of negatives are projected onto successive frames of web material. The thus exposed web material is admitted into a second cassette which can be transported to a further station, e.g., to a station where the exposed web material is subdivided into prints and the prints are introduced into customer envelopes, together with the respective negatives, for shipment or delivery back to dealers or directly to customers. A drawback of the machine which is described and shown in the German patent is its cost which is attributable, to a considerable extent, to the need for a motorized elevator. Moreover, the patented copying machine occupies a large amount of floor space and the exchange of cassettes takes up long intervals of time because the elevator must be operated at a relatively low speed for safety reasons. Therefore, the expenditures which are involved in connection with the purchase and maintenance of the patented machine are warranted only in large photographic developing laboratories but not in connection with medium priced and low priced roll copiers and like machines, especially low- and medium-priced machines which should be capable of processing a variety of photosensitive materials including larger and smaller rolls of wide, medium wide or narrow webs of photographic paper or the like.

OBJECTS OF THE INVENTION

An object of the invention is to provide a simple, compact and versatile photographic copying machine which can be assembled and operated at a reasonable cost.

Another object of the invention is to provide an improved copying machine of the type which is operated with mobile cassettes or analogous containers for photosensitive web material.

A further object of the invention is to provide the copying machine with novel and improved means for facilitating manual handling of cassettes for exposed or unexposed photographic web material.

An additional object of the invention is to provide a machine which enables a relatively weak person to manipulate relatively large and relatively heavy cassettes with a minimum of effort and with minimal risk of injury.

Still another object of the invention is to provide a novel and improved method of manipulating cassettes or analogous containers for exposed or unexposed photographic web material in a photographic roll copier.

A further object of the invention is to provide novel and improved cassettes for use in the above outlined machine.

An additional object of the invention is to provide a novel and improved copying unit for use with the improved cassettes in the above outlined machine.

Another object of the invention is to provide a novel and improved method of changing the level of cassettes for photographic paper or other photosensitive web material and for otherwise manipulating such cassettes without the need for motorized elevators and analogous bulky and expensive equipment.

A further object of the invention is to provide a copying machine which can accept cassettes of standard size as well as larger or smaller cassettes.

An additional object of the invention is to provide a copying machine wherein properly positioned cassettes can be automatically or manually locked in predetermined positions.

SUMMARY OF THE INVENTION

The invention is embodied in a photographic copying machine which comprises a copying unit, at least one container for photosensitive web material, and means for facilitating manual manipulation of the at least one container relative to the copying unit, such manual manipulation including manual displacement of the at least one container between an upper level and a lower level and manual pivoting of the at least one container at one of the levels (normally at the upper level) about a substantially horizontal axis between an upright position and a downwardly inclined position, preferably at an angle of at least 60° to the upright position. The at least one container includes a portion which constitutes a bottom portion when the at least one container is held in upright position, and the bottom portion has a marginal zone. The facilitating means comprises at least one first coupling element which is provided on the at least one container at the marginal zone of the bottom portion, and at least one complementary second coupling element which is provided on the copying unit and is engageable with and disengageable from the at least one first coupling element at least in the inclined position of the at least one container so that the engaged coupling elements together define the substantially horizontal pivot axis for manual pivoting of the at least one container between the upright position and the inclined position.

The machine can further comprise guide means defining a track (preferably a horizontal track) for manual shifting of the at least one container between a first location in which the at least one container is pivotable to the inclined position and a second location, particularly in a chamber of the copying unit. The at least one container is maintained in or close to the upright position during movement between the first and second locations.

One of the first and second coupling elements can comprise a pintle which defines the pivot axis, and the other of the first and second coupling elements can comprise at least one hook which surrounds the pintle along an arc of at least 90° during pivoting of the at least one container between the upright position and the inclined position, i.e., when the first coupling element or elements are engaged by the second coupling element or elements. The pintle (such pintle can consist of two or more discrete coaxial sections) is preferably provided on the at least one container. Such pintle has a side which faces away from the copying unit when the first coupling element or elements are in engagement with the second coupling element or elements, and the at least one hook preferably engages such side of the pintle during pivoting of the at least one container.

The bottom portion of the at least one container can be provided with at least one follower which extends substantially at right angles to the pivot axis, and such follower or followers are movable along the track to thus facilitate manual shifting of the at least one container between the first and second locations. When the at least one container is moved to the first location, it is (or it can be) located in a chamber of the copying unit. The at least one follower can comprise a plurality of elongated runners or skids, and the at least one second coupling element can be disposed between two skids during engagement with the at least one first coupling element. A film of friction reducing material (such as a suitable plastic material) can be provided between the at least one follower and the track; such friction reducing material can form a film on the at least one follower and/or on the track.

The copying unit comprises means for advancing web material in a direction which is substantially parallel to the pivot axis in the upright position of the at least one container or as long as the at least one container is coupled to the printing unit. The at least one container is ready to receive web material from, or to pay out web material into, the copying unit after it has been moved to the aforementioned first location which may but need not be within the copying unit.

The at least one container is preferably provided with means (e.g., in the form of a rotary core or spool) for storing web material in the form of a roll having an axis which is substantially parallel to the pivot axis when the at least one container is coupled to the copying unit. The axis of the spool or core is normal to the track, i.e., to the direction of shifting of the at least one container between the first and second locations.

The container can be provided with at least one channel for the at least one second coupling element, and such at least one channel receives the at least one second coupling element during shifting of the at least one container between the first and second locations. The arrangement is preferably such that the bottom portion of the at least one container is provided with several channels if the manipulation facilitating means comprises a plurality of second coupling elements, one for each channel.

The at least one container has a first side which is its upper side when the at least one container is maintained in the upright position, and a second side which is adjacent the first side and constitutes an upright lateral side facing away from the copying unit in the upright position of the at least one container. The latter is preferably provided with handgrip means at the first and/or at the second side. Such handgrip means is preferably collapsible against or (recessible) into the respective side of the at least one container. The copying unit can be provided with means for yieldably biasing the at least one second coupling element to an extended position in which the at least one second coupling element is sufficiently exposed to be engageable by the at least one first coupling element.

If the copying unit is provided with a chamber which receives the at least one container when the latter is shifted to the first location, the copying unit can be further provided with a lighttight closure (e.g., a slidable or pivotable door) for the chamber.

The copying unit can be provided with a first elongated slit for photosensitive web material, and the at least one container can be provided with a second elongated slit which is adjacent and is aligned with the first slit in the upright position of the at least one container. The web material which is stored in the at least one container preferably forms a roll having an axis which is parallel to the slits. Means can be provided for releasably locking the at least one container to the copying unit while the at least one container is maintained in the upright position and its slit is adjacent and is aligned with the slit of the copying unit.

The novel features which are considered as characteristic of the invention are set forth in particular in the appended claims. The improved copying machine itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
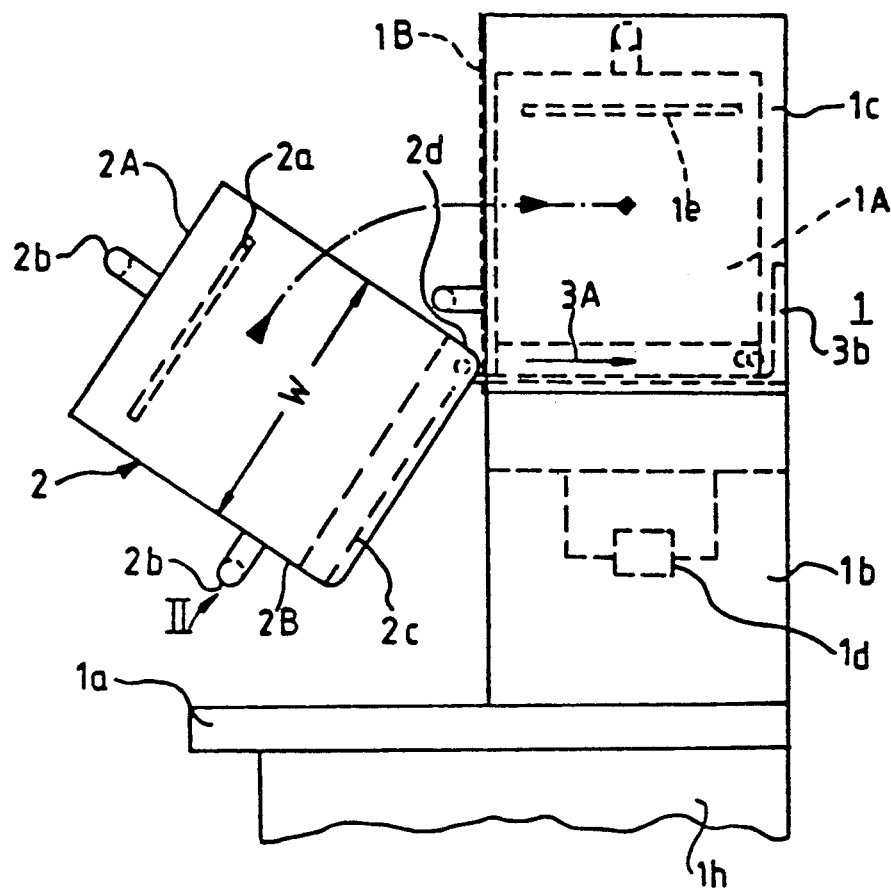
FIG. 1 is a fragmentary end elevational view of a photographic roll copying machine which embodies one form of the invention, a container being coupled to the copying unit in an inclined position preparatory to manual pivoting to an upright position.

FIG. 1 shows a portion of a photographic roll copying machine 1 of the type wherein a web of photosensitive material must be advanced through the copying station at a level well above a horizontal table or support 1a for a copying unit of conventional design. The table 1a disposed above a lamp housing 1h and includes a platform for negatives (not shown) which are to be imaged onto a web of photosensitive material, such as photographic paper. A negative which has been placed onto the platform is located above the light source or sources in the lamp housing 1h, and its image is projected upwardly onto the registering frame of the web in a copying unit including a lower section 1b and an upper section 1c, both above the table 1a. The reference character 1d denotes a lens or a system of lenses in the lower section 1b of the copying unit. The upper section 1c of the copying unit includes means (note the rollers 1f in FIG. 5) for advancing the web of photosensitive material at right angles to the plane of FIG. 1, namely in parallelism with the axis of a pintle 2f (FIGS. 2 and 3) constituting one element of a separable hinge or coupling between the copying unit 1b+1c and a cassette or container 2 for unexposed photosensitive web material. Such material is stored on a core or spool having an axis which is normal to the axis of the pintle 2f. The upper section 1c of the copying unit is located between a properly positioned (upright) container 2 and a second container (not shown) which is disposed behind the plane of FIG. 1 and serves to receive and store (on a spool or on a core) the exposed web of photosensitive material. Reference may be had to the aforementioned commonly owned U.S. Pat. No. 4,853,742 which shows a copying unit between two wheel-mounted containers or cassettes. A rotary core for reception of a roll of convoluted photosensitive material is shown in commonly owned U.S. Pat. No. 4,218,032 to which reference may be had, if necessary.

The lower section 1b of the copying unit comprises two upright brackets which support the upper section 1c at a level above the table 1a. The upper section 1c has an inlet in the form of an elongated horizontal slit 1e which is aligned with a similar slit 2a of the container 2 when the latter is maintained in an upright position and is located within a chamber 1A of the section 1c. Such chamber can be lighttightly sealed by a door or gate 1B (indicated by a broken line) which is pivotably or slidably secured to the copying unit 1b+1c and serves to prevent penetration of outside light into the chamber 1A when the copying machine 1 is in actual use. One pair of advancing rollers 1f in the upper section 1c is located immediately or closely behind the slit 1e to entrain the web of photosensitive material between successive exposures. The dimensions of the chamber 1A slightly exceed the dimensions of the container 2 which resembles a cube having a portion 2c constituting its bottom portion when the container is maintained in an upright position in which it can be shifted (pushed or pulled) into and out of the chamber 1A.

Figure 2:
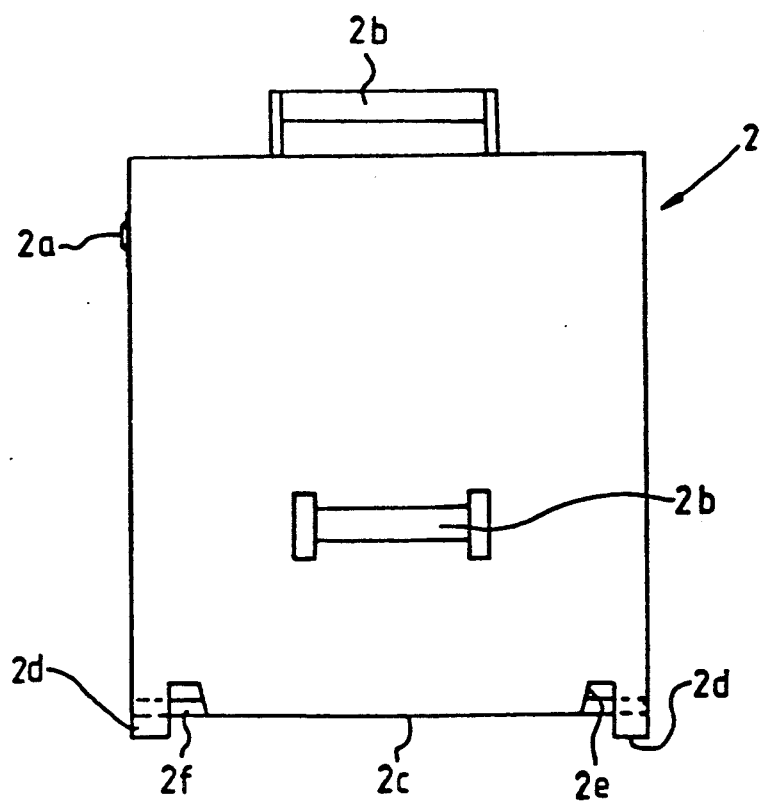
FIG. 2 is an enlarged elevational view of the container as seen in the direction of arrow II in FIG. 1.
Figure 3:
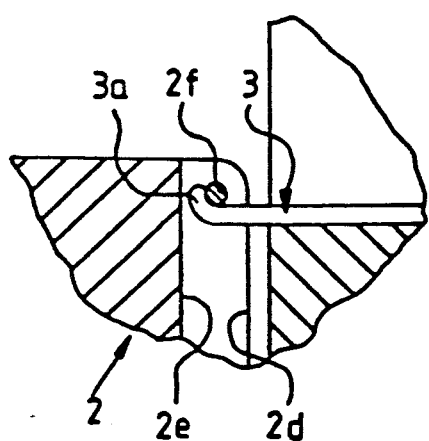
FIG. 3 is an enlarged partly elevational and partly sectional view of a first coupling between a container and the copying unit.

The details of one presently preferred embodiment of a container 2 are shown in FIGS. 2 and 3. This container has a side 2A which is located opposite the bottom portion 2c and is the upper side of the container when the latter is maintained in an upright position. A second side 2B is adjacent the side 1A and constitutes an upright lateral side when the container 2 is maintained in the upright position; the side 2B then faces away from the copying unit 1b+1c as long as the container is at least partially outside of the chamber 1A. The width W of of the container 2 slightly exceeds the width of the web material which is stored therein. The width of the web material, and hence the axial length of the roll of convoluted material in the container 2, is slightly less than the length of the slit 2a. This slit is sealed to prevent penetration of light into the container 2 in a manner not forming part of the present invention. For example, the slit 2a can be sealed by two rollers which define a nip and are biased against each other to permit a web to pass between them when one of the rolls is caused to yield against the opposition of one or more springs. Alternatively, the slit 2a can be sealed in manner known from the field of cassettes for unexposed and exposed photographic roll films. The other two dimensions of the container 2 depend upon the diameter of the roll of convoluted web material therein.

The sides 2A and 2B are provided with centrally or nearly centrally located handgrip portions 2b which can be pivoted against or recessed into the respective sides and form part of a means for facilitating manual manipulation of the container 2 including a movement between a lower level (particularly on the table 1a) and an upper level (of the chamber 1A), pivoting about a substantially horizontal axis of the pintle 2f between an inclined position and an upright position, and shifting (in upright position) into and out of the chamber 1A along a path which is normal to the pintle 2f.

The cassette or container 2 can be opened and closed and sealed in a conventional manner. For example, the top portion including the side 2A can be pivotally connected to the bottom portion 2c by one or more hinges so that the top portion can be pivoted from the illustrated position in order to provide room for introduction of a fresh roll of unexposed photographic web material. One of the top and bottom portions carries a locking bolt or a like device which engages a complementary locking device on the other portion of the container 2 when the top portion is returned to the position of FIG. 1 or 2 so that the freshly inserted roll of unexposed photosensitive web material is shielded from external light.

The bottom portion 2c of the container 2 is provided with a follower including two spaced-apart skids or runners 2d extending at right angles to the pintle 2f and being slidable along a guide 3 (FIG. 3) which is located in the chamber 1A and defines an elongated track extending at right angles to the pivot axis for the container 2, i.e., at right angles to the axis of the pintle 2f.

That marginal zone of the bottom portion which is parallel to and remote from the side 2B carries the pintle 2f (this pintle can consist of two or more coaxial sections) which constitutes the male element of the coupling or hinge between the container 2 and the copying unit 1b+1c. The coupling forms part of the means for facilitating manual manipulation of the container 2 and further includes two female coupling elements in the form of hooks 3a which are provided on the section 1c adjacent the chamber 1A and can engage the adjacent portions of the pintle 2f at least while the container is maintained in the inclined position of FIG. 2. FIG. 3 shows that the hooks 3a engage that side of the 2f which faces away from the copying unit 1b+1c while the container 2 is located outside of the chamber 1A. The hooks 3a are disposed between the skids 2d of the bottom portion 2c when they engage the pintle 2f.

The undersides of the skids 2d and/or the upper sides of the two halves of the guide 3b (one for each of the skids) are preferably coated with films of friction reducing material (such as polytetraflucroethylene) in order to facilitate shifting of the container 2 between a first location within the chamber 1A and a second location outside of and adjacent the chamber. When moved to the second location, the container 2 can be pivoted through an angle of at least 60° preparatory to separation of its pintle 2f from the hooks 3a so that the thus detached container can be moved from the level of the chamber 1A to a lower level, particularly onto the table 1a.

The bottom portion 1c of the container 2 is formed with two channels 2e, one for each of the hooks 3a, so that the hooks cannot interfere with shifting of the container into and out of the chamber 1A because, at such time, the channels 2e move relative to the respective hooks 3a while the skids 2d advance along the tracks which are defined by the respective halves of the guide 3b in the chamber 1A.

The pintle 2f can constitute an elongated cylindrical rod which is accessible to the hooks 3a at least in the regions of the channels 2e so that the pintle can be placed onto or lifted off the hooks at least in the inclined position of the container 2. The hooks 3a can form integral portions of the respective halves of the guide 3b. Each half of the guide 3 can constitute an elongated rail which is bent upwardly at 3b to constitute a stop for the respective skid 2d when the container 2 is properly located in the chamber 1A. The hooks 3a are preferably configurated in such a way that they surround the pintle 2f along arcs of at least 90° when the coupling is operative, i.e., when the container 2 is properly supported by the rails of the guide 3.

The hooks 3a can be mounted for movement relative to the rails of the guide 3 against the opposition of suitable springs (not shown) so that the hooks can be depressed into the chamber 1A or into another part of the section 1c prior to pivoting or sliding of the door 1B to the closed or sealing position. The direction of movement of hooks 3a into the section 1c against the opposition of springs or other suitable biasing means is indicated by arrow 3A.

The mode of manipulating the illustrated container 2 is as follows:

The container 2 is assumed to contain a fresh roll of unexposed photosensitive web material (such as photographic paper) and its top and bottom portions are locked to each other. The slit 2a is sealed so that the confined roll of photosensitive material is shielded from outside light. The person in charge then grasps the two handgrip portions 2b and lifts the container 2 from the level of the table 1a (or from another lower level) to a higher level so that the pintle 2f is located at the upper end of the bottom portion 2c and is still observable by the person holding the container because the latter is preferably lifted onto to the level of her or his chest, i.e., to a level such that the person holding the handgrip portions 2b can still see those parts of the pintle 2f which extend across the (then) upper ends of the channels 2e. This enables the operator to deposit the pintle 2f onto the hooks 3a whereby the copying unit 1b+1c takes up approximately one-half of the weight of the thus lifted container 2. Therefore, the operator must exert a relatively small force in order to manually pivot the downwardly inclined container 2 (which is suspended on the hooks 3a) to an upright position in which the skids 2d are ready to slide along the respective rails of the guide 3 while the container is being shifted (pushed) into the chamber 1A. In other words, pivoting of the container 2 which is supported by the hooks 3a involves pivoting only one-half of the total weight of the container.

If the pivoting involves an angular movement through full 90° (i.e., from an inclined position in which the skids 2d on the bottom portion 2c are substantially vertical to a position in which the skids are horizontal), the center of gravity of the container 2 is lifted through a distance which equals or approximates the height of the container. Pivoting to upright position involves exertion of a pull upon the lower handgrip portion 2b of FIG. 1 and the exertion of a push upon the upper handgrip portion 2b, i.e., the operator exerts a tilting moment about a horizontal axis defined by the pintle 2f which is then supported by the hooks 3a. Such pivoting is much more convenient and less tiresome than simple lifting of an upright container 2 from a lower level to the level of the chamber 2A so that the lifted container can be pushed into the chamber. The film or films of friction reducing material on the skids 2d and/or on the rails of the guide 3 contribute to a reduction of the force which must be exerted by the operator in order to shift the freshly pivoted container 2 (in upright position) into the chamber 1A.

A locking mechanism can be provided to releasably hold the container 2 in the chamber 1A in an optimum position so that the slit 2a is in register with the slit 1e of the section 1c. For example, the upwardly bent portions 3b of the rails forming part of the guide 3 can constitute or carry magnets which attract the adjacent portions of the container 2 so that the latter is releasably held in the chamber 1A. The door 1B is pivoted or slid to the closed position prior to the making of exposures.

The manipulation of the container 2 is repeated in reverse when the supply of unexposed photosensitive web material is exhausted. The operator then opens the door 1B, the locking or retaining force of the aforementioned magnet or magnets is overcome (or the container is disengaged from the section 1c in another way, e.g., by moving a locking bolt, a pawl or the like to an inoperative position), the container 2 is pulled out of the chamber 1A, the container is pivoted or tilted through an angle of preferably more than 60°, and the pintle 2f is then disengaged from the hooks 3a so that the container can be opened and filled with a fresh supply of unexposed photosensitive material or that the container can be moved out of the way in order to provide room for manipulation of another container which contains a supply of unexposed web material and is ready to be introduced into the chamber 1A.

The aforedescribed construction of the manipulation facilitating means 2b, 2f, 3a is based on the recognition that a person of average strength or a person of less than average strength is less likely to encounter serious problems while lifting a relatively heavy container from a lower level to the level of her or his chest, i.e., while the hands are in the process of pulling the container to a level which is needed to place the pintle 2f onto the hooks 3a. Lifting of the container 2 above the chest level would be much more difficult because the hands would then be called upon to exert a pushing rather than a pulling force, an effort which is much more strenuous than simple pulling of the container above the level of the table 1a or above another level below that which is required to suspend the pintle 2f on the hooks 3. In addition, if the container 2 is to be lifted only to the level of the chest of the operator, such person is still capable of seeing the pintle 2f in the regions of the channels 2e which greatly facilitates the deposition of pintle 2f onto the hooks 3a.

The mechanical work which is to be performed in order to pivot the downwardly inclined container 2 to an upright position prior to shifting into the chamber 1A is the same as if the container were to be manually lifted all the way to the level of the chamber 1A; however, the distance which is covered by the center of gravity of the container 2 is increased in comparison to the distance which the center of gravity covers during lifting of an upright container all the way to the level of the chamber 1A so that the magnitude of the force which is needed to move the container to an upright position at the level of the chamber 1A is reduced in half.

Figure 4:
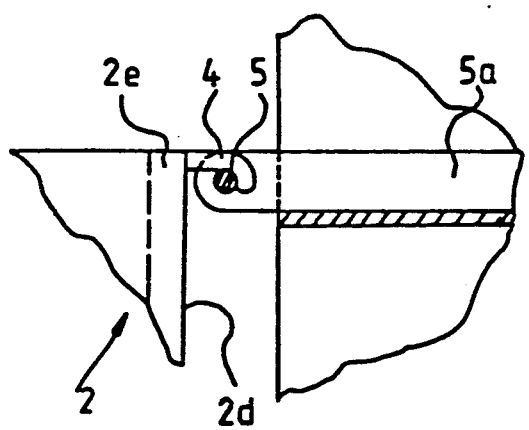
FIG. 4 is a similar partly elevational and partly sectional view of a modified coupling.

FIG. 4 shows that the coupling of FIG. 3 can be modified by installing a pintle 5 on the copying unit and by providing the hooks 4 on the container 2. The hooks 4 can form integral parts of the bottom portion of the container 2, and the pintle 5 preferably forms part of a substantially U-shaped yoke 5a. An advantage of each of the two couplings which are shown in FIGS. 3 and 4 is that they prevent the container 2 from sliding to the left as soon as the pintle 2f or 5 is properly engaged by the hooks 3a or 4. This is desirable and advantageous because an operator is less likely to be injured by the container 2 as long as the coupling of FIG. 3 or 4 is operative to carry approximately one-half of the weight of the lifted container. In FIG. 4, the hooks 4 engage that side of the pintle 5 which faces toward the copying unit.

Figure 5:
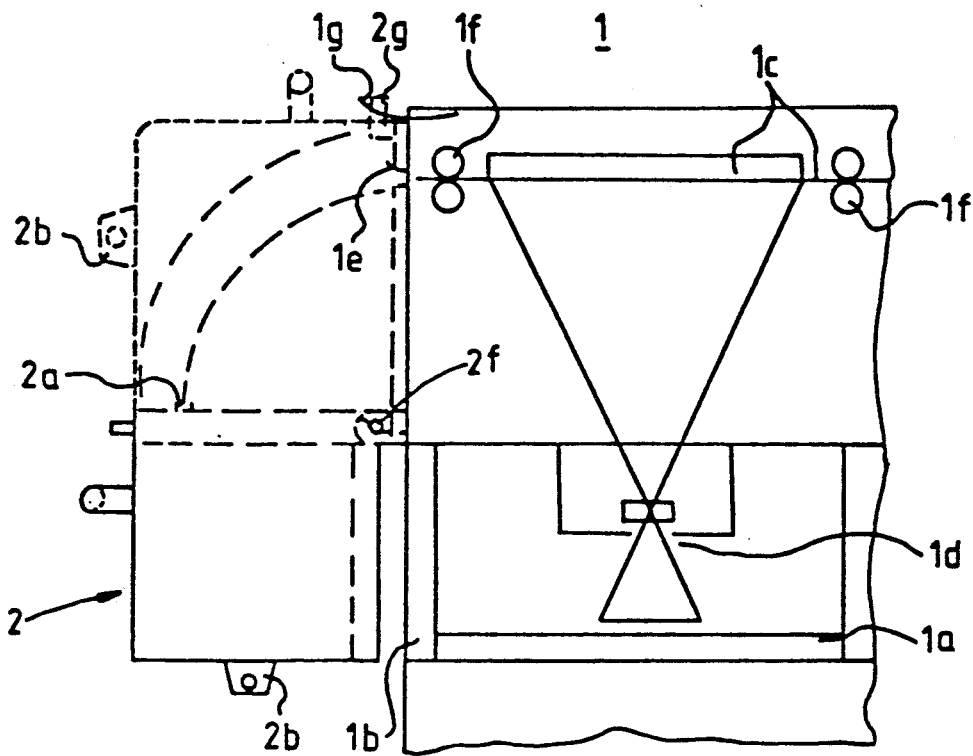
FIG. 5 is a fragmentary front elevational view of a modified copying machine with a container at one end of the copying unit.

FIG. 5 shows a portion of a modified copying machine 1 wherein all such parts which are identical with or clearly analogous to corresponding parts of the machine 1 of FIG. 1 are denoted by similar reference characters. The difference is that the axis of the roll of convoluted web material in the container 2 of FIG. 5 is parallel to the pivot axis which is defined by the pintle 2f of the coupling or hinge of the manipulation facilitating means because the container is not disposed at one end but rather at one side of the copying unit 1b+1c. Therefore, once it has been pivoted to the upright position which is indicated by broken lines, the container 2 need not be shifted or slid into the upper section 1c of the copying unit but is simply latched to the section 1c to remain in upright position and to thus maintain its slit 2a in immediate proximity to and in proper alignment with the slit 1e of the upper section 1c so that the leader of the web in the container 2 extends into the nip of the adjacent advancing rollers 1f and can be pulled in a direction at right angles to the pivot axis.

The means for releasably locking the container 2 to the upper section 1c of the copying unit includes a spring 1g which is provided on the upper section 1c and automatically snaps behind a projection 2g of the container 2 as soon as the latter is pivoted to the upright position.

The construction of the separable coupling between the container 2 and the upper section 1c of the copying unit of FIG. 5 is or can be identical with the construction of the coupling which is shown in FIG. 3 or 4. It is clear that the container 2 and/or the upper section 1c is provided with suitable sealing means to prevent penetration of daylight or room light into the slits 2a, 1e when the container of FIG. 5 is locked to the section 1c in upright position. For example, the left-hand side of the upper section 1c can be provided with a shallow recess which snugly and sealingly receives the adjacent portion of the container 2 when the container is moved to the upright position.

Figure 6:
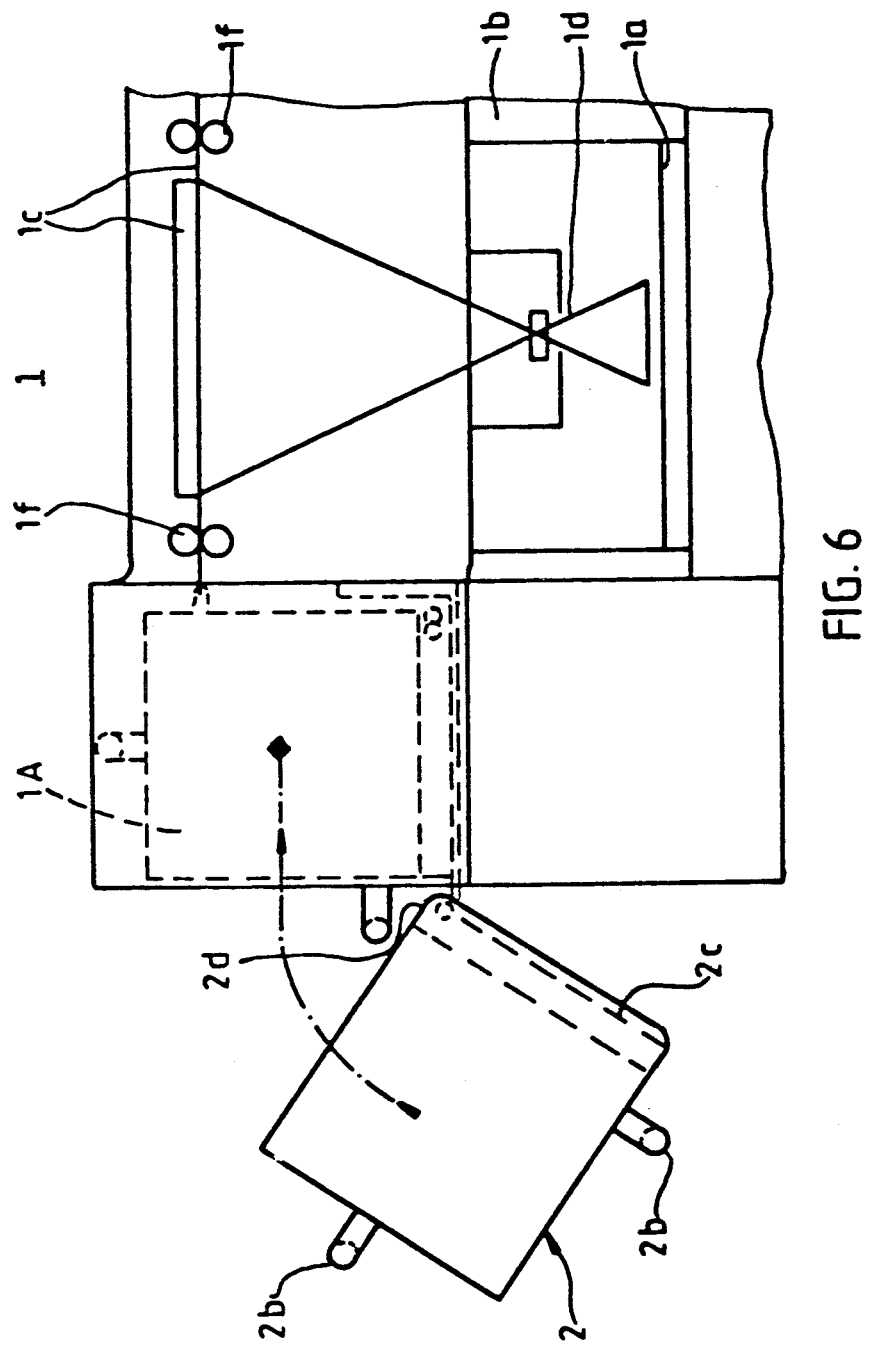
FIG. 6 is a fragmentary front elevational view of a copying machine which constitutes a modification of the machine of FIG. 5.

FIG. 6 shows certain details of a copying machine 1 which constitutes a modification of the machine of FIG. 5 and embodies certain features of the machine 1 of FIG. 1. The chamber 1A for the pivotably supported container 2 is not located in but is located at one end of the upper section 1c of the copying unit 1b+1c. The opening of the chamber 1A is located at the left adjacent to the coupling element or elements on the copying unit. The container 2 is simply lifted with assistance from the handgrip portions 2b so that its coupling element or elements can engage the complementary coupling element or elements of the copying unit, and the container is then pivoted by hand to assume an upright position prior to being shifted (pushed) from a location outside to a location within the chamber 1A. The open side of the chamber 1A is then sealed by a door or gate (not shown in FIG. 6) by pivoting or sliding the door or gate to a sealing or closing position. The axis of the roll of convoluted photosensitive web material in the container 2 of FIG. 6 is parallel to the pivot axis for the container and is normal to the direction of advancement of the web through the copying unit.

The pivot axis for the container 2 of FIG. 6 is located to the left of such axis in the machine of FIG. 5, namely spaced apart a distance which corresponds to the length of the skids 2d, i.e., to the dimension of the container as measured at right angles to the pivot axis.

The copying machine of FIG. 6 is somewhat bulkier than the machine of FIG. 5 because the chamber 1A is located to the left of the upper section 1c of the copying unit 1b+1c which is shown in FIG. 5. However, the manipulation of the container 2 of FIG. 6 is more convenient because the person in charge is less impeded by the table 1a of the copying machine 1. The manner of designing the manipulation facilitating means including the handles 2b and the separable coupling between the container 2 of FIG. 6 and the upper section 1c of the copying unit is or can be the same as described with reference to FIGS. 1-3 or with reference to FIG. 4.

Roll copiers of the type wherein the copying unit is combined with a developing machine to constitute a so-called minilab do not employ any cassettes for exposed photosensitive web material because the material which issues from the copying machine is admitted directly into the developing machine. However, a copying machine which is not combined with a developing machine and operates with containers for storage of large quantities of unexposed photosensitive material normally employs cassettes or containers which receive the exposed web. In such machines, the improved manipulation facilitating means will be provided for cassettes or containers which store unexposed web material as well as for cassettes or containers for storage of exposed photosensitive web material. In other words, a copying machine of the type shown in commonly owned U.S. Pat. No. 4,853,742 can be modified to embody first manipulation facilitating means for the cassette which stores unexposed web material and second manipulation facilitating means for the cassette which is intended to store exposed web material.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A photographic copying machine comprising a copying unit; at least one container for photosensitive web material; and means for facilitating manual manipulation of said at least one container relative to said copying unit including manual displacement of said at least one container between an upper level and a lower level and manual pivoting of said at least one container at one of said levels about a substantially horizontal axis between an upright position and a downwardly inclined position at an angle of at least 60° to said upright position, said at least one container including a portion which constitutes a bottom portion in said upright position and has a marginal zone, said facilitating means comprising at least one first coupling element provided on said at least one container at said marginal zone and at least one complementary second coupling element provided on said copying unit and engageable with and disengageable from said at least one first coupling element at least in said inclined position so that the engaged coupling elements together define said substantially horizontal axis for manual pivoting of said at least one container between said positions thereof.

2. The machine of claim 1, further comprising guide means defining a track for manual shifting of said at least one container in upright position between a first location in which said at least one container is pivotable to said inclined position and a second location.

3. The machine of claim 1, wherein one of said first and second coupling elements comprises a pintle which defines said axis and the other of said first and second coupling elements comprises at least one hook which surrounds said pintle along an arc of at least 90° during pivoting of said at least one container between said upright position and said inclined position.

4. The machine of claim 1, wherein said pintle is provided on said at least one container.

5. The machine of claim 4, wherein said pintle has a side facing away from said unit and said at least one hook engages said side of the pintle during pivoting of said at least one container.

6. The machine of claim 1, wherein said portion of said at least one container has at least one follower extending substantially at right angles to said axis, and further comprising a track provided in said unit for said at least one follower to facilitate manual shifting of the at least one container in the upright position thereof between spaced apart first and second locations within and outside of said unit, respectively.

7. The machine of claim 6, wherein said at least one follower comprises a plurality of spaced-apart parallel skids including first and second skids, said at least one second coupling element being disposed between said first and second skids during engagement with said at least one first coupling element.

8. The machine of claim 6, further comprising a film of friction reducing material between said at least one follower and said track.

9. The machine of claim 6, wherein said unit has a chamber for said at least one container and said at least one container enters into and is at least subtantially confined in said chamber in response to movement to said first location.

10. The machine of claim 1, wherein said unit comprises means for advancing the web material in a direction substantially parallel to said axis in the upright position of said at least one container.

11. The machine of claim 10, further comprising guide means defining a track for manual shifting of said at least one container into and from said unit in the upright position of said at least one container.

12. The machine of claim 1, wherein said at least one container includes means for storing web material in the form of a roll having an axis which is substantially parallel to said horizontal axis.

13. The machine of claim 12, further comprising guide means defining a track for movement of said at least one container in upright position substantially at right angles to said axes between a first location in which said at least one container is pivotable to said inclined position and a second location.

14. The machine of claim 1, further comprising guide means defining a track for manual shifting of said at least one container in upright position between a first location in which said at least one container is pivotable to said inclined position and a second location, said container having at least one channel for said at least one second coupling element and said at least one second coupling element being received in said at least one channel during shifting of said at least one container between said container.

15. The machine of claim 14, wherein said portion of said at least one container has a plurality of parallel channels and said facilitating means comprises a plurality of second coupling elements, one for each of said channels.

16. The machine of claim 1, wherein said at least one container has a first side and a second side, said first side being located opposite said portion and constituting the upper side in the upper right position of said at least one container, said second side being adjacent said first side and constituting an upright lateral side facing away from said unit in the upright position of said at least one container, said at least one container having handgrip means at least at one of said first and second sides.

17. The machine of claim 16, wherein said handgrip means is collapsible against or into said at least one side.

18. The machine of claim 1, wherein said unit further comprises means for yieldably biasing said at least one second coupling element to an extended position in which said at least one second coupling element is engageable by said at least one first coupling element.

19. The machine of claim 1, wherein said unit has a chamber and further comprising guide means defining a track for manual shifting of said at least one container in said upright position between a first location in which said at least one container is pivotable to said inclined position and a second location within said chamber, and further comprising a light-tight closure for said chamber.

20. The machine of claim 1, wherein said unit has a first slit for photosensitive web material and said at least one container has a second slit which is adjacent and is aligned with said first slit in the upright position of said at least one container, said at least one container further having means for storing web material in the form of a roll having an axis which is parallel to said slits.

21. The machine of claim 20, further comprising means for releasably locking said at least one container to said unit in said upright position in which said slits are adjacent and aligned with each other.

* * * * *